Patented May 5, 1925.

1,536,382

UNITED STATES PATENT OFFICE

EDWIN C. ECKEL, OF WASHINGTON, DISTRICT OF COLUMBIA.

PROCESS OF MAKING IRON AND CEMENT.

No Drawing. Application filed March 1, 1924. Serial No. 696,395.

*To all whom it may concern:*

Be it known that I, EDWIN C. ECKEL, a citizen of the United States, residing at Washington, in the District of Columbia, have invented certain new and useful Improvements in Processes of Making Iron and Cement, of which the following is a specification.

Alumina cements, or ciment fondu, differ from all previous cements in their composition, carrying from 30 to 50% lime, from 30 to 50% alumina, and not over 20% of silica and iron oxide together. They also differ from previous cements in their technical properties, being extremely resistant to chemical attack, and giving test strengths at 24 hours from five to twenty times as great as those reached by Portland cements.

With these technical advantages, alumina cement would obviously replace Portland cement for all uses, provided it can be supplied at a cost not markedly higher than that of its competitor. At present, the best mills produce ciment fondu at costs ranging from 2½ to 3 times that of Portland cement. These costs are due to defects in the processes employed, and to restriction of the raw materials used in an unnecessary and very expensive way. In my improved process, as described below, these defects and restrictions are eleminated. With this new process alumina cements can be supplied in most of the important cement markets of the world at a cost lower than that of Portland cement.

After over fifteen years of steady working, the alumina cement industry in France, where alone it has been commercially practised, has reached a condition of current practice that may be described, in detail, as follows:

Aside from a few unsuccessful experimental plants, all the alumina cement or ciment fondu produced commercially anywhere in the world today is made in small vertical furnaces, ranging from 30 to 45 inches in diameter, and from 10 to 15 feet in height. They are water jacketed, have no regenerative stoves, are driven with a light blast which is slightly heated, and are run on coke. Their ratio of height to diameter, a factor of prime importance, ranges from 3:1 up to 4:1. Their fuel consumption ranges between 25% and 33⅓% of the weight of saleable product. Their output ranges from 10 to 30 tons of saleable product per day.

Row materials: The raw materials used everywhere are (*a*) bauxite and (*b*) burned lime or quicklime—not crude limestone. The bauxite is a good grade ore, ranging as shown below in actual analysis:

| | | | | |
|---|---|---|---|---|
| Silica | 4.30 | 1.50 | 8.20 | 1.90 |
| Iron oxide | 14.48 | 14.58 | 13.70 | 9.38 |
| Alumina | 66.48 | 70.22 | 57.80 | 64.40 |

It will be seen that this ore is saleable to the aluminum and other industries, so that the alumina cement trade is bidding against important uses for its raw material, and consequently pays a high price per ton for its bauxite.

The lime used is low silica; it is burned, prior to charging, to ensure better combination of the cement-forming ingredients: this procedure is necessary in the type of furnace heretofore used.

The lime and bauxite are mixed, prior to charging; in part, indeed, the charge is made up of fine bauxite and lime actually briquetted together; this care and expense in mixing is also necessitated by the inefficiency of the burning process employed.

Operation: The coke being charged in layers, followed by a layer of mixed lime and bauxite, the gradual burning melts the charge and permits the melted material to sink down to the bottom of the furnace. The cement is tapped off as a continuous stream of molten matter, which is cooled, crushed and ground to powder. This powder is the finished ciment fondu or alumina cement of trade.

But the grinding is complicated, in existing practice, by the presence of more or less metallic iron scattered as globules or masses thruout the cooled cement mass. This is due to the reduction of part of the iron oxide contained in the charge. Part of the iron so reduced sinks directly to the bottom of the furnace, and can be tapped separately and used or sold as iron. But the small mass of this separated iron causes its rapid cooling, and frequent freezing up in the furnace; while both the smallness of the iron mass and the system of continuous tapping prevent a clean separation of all of the reduced iron from the cement. The consequence is that globules of iron, as above noted, are always present in the cement as tapped off—and these necessitate expensive magnetic or other separation before the cement can be put thru the fine grinding machinery.

The outline above given suggests clearly enough the points in which existing practice is, in my judgment, defective. These defects involve both irregularity in the character of the product, and expense in its manufacture. The chief defects may be noted as follows:

a. High fuel consumption per unit of saleable product.

b. Necessity for use of high grade bauxite ore.

c. Necessity for use of burned lime.

d. Necessity for prior mixing of lime and bauxite.

e. Freezing of iron metal at base of furnace.

f. Necessity for magnetic separation of included iron globules.

g. Segregation and irregularity in composition of product.

Taken together these defects involve very heavy expenses in fuel, raw materials, grinding costs and labor; they involve also, at times, defects in the regularity of composition of the cement, or in its quality.

These defects are remedied by my invention and the improvements noted below and claimed in this application result in the production of alumina cement or ciment fondu of superior quality at a cost far lower than has ever been attained in any existing mill, and the invention includes the following features:

Furnace: In place of a small furnace, with height only 3 to 4 times its diameter, I use a high furnace, with lines much like those of an iron blast furnace, its height being at least five times and preferably eight times its diameter. This is preferably equipped with its own regenerative stoves, with gas recovery, and with a top designed to reduce dusting. The increased ratio of height to diameter gives complete combination of the constituents of the charge, and prevents the segregation always a bad feature of the short furnace now used.

Raw materials: In place of high grade bauxite and quicklime, I make use of far cheaper raw materials. I use crude limestone in place of lime, and bauxite which may be of low grade, and deliberately add iron ore to the mix in order to carry up the iron content above the amount carried by even the most ferruginous bauxite. This iron addition has three beneficial and novel results. It aids in fluxing in the furnace, it gives a larger mass of metallic iron so that freezing is eliminated, and it adds greatly to the saleable tonnage per ton of fuel, thereby reducing cost of the cement. A typical mix includes equal parts of limestone and bauxite and preferably from 25 to 50% iron ore, which latter may be an oxide or carbonate of iron, indifferently, provided it carries less than 10% silica. To this is added coke in sufficient quantities.

Such a mix will result, after loss of its volatile constituents, in a charge containing not less than 25 nor more than 55% of lime, or of lime and magnesia together, not less than 25 nor more than 50% of alumina (with perhaps traces of titanic oxide), nor more than 5% of silica, and not less than 10% of iron oxide. Such a charge results in the desired low silica and high alumina cement which it is the object of the invention to produce commercially.

All these benefits are accomplished actually by the use of cheap ore and commoner raw materials than can at present be employed in existing practice. Further, it is no longer necessary to briquette or even mix the limestone and bauxite together prior to charging; I prefer to charge them separately, from separate stock piles, so as to make the mechanical handling more simple and efficient, and to reduce the amount of human labor now necessary per ton of product.

Operation: In operating methods I replace the system of continuous tapping, as now practiced, by discontinuous tapping, thereby permitting the reduced iron to separate itself cleanly from the lighter molten cement. This eliminates the presence of iron globules in the cooled cement, and removes the necessity for the expensive and inconvenient magnetic separation of these globules now necessary in existing practice.

When a blast furnace of sufficient height to permit the various chemical reactions and combinations to be carried out completely is charged with coke or other fuel and with limestone, bauxite and iron ore as described in my process, the first effect of the furnace heat will be to dehydrate the bauxite and to decarbonate the limestone. These two actions will take place in the upper part of a high furnace as described. As the charge sinks in the furnace, reduction of the iron oxide or carbonate takes place followed by a combination of lime (resulting from the limestone) with the alumina and silica and a portion of the iron oxide, derived from the bauxite and the iron ore. As the molten material flows downward in the furnace, the reduced metallic iron separates from the lighter lime—alumina—silica—iron oxide compounds that have been formed. The molten iron sinks to the bottom because of its higher specific gravity and separates very cleanly from the lighter cement-forming compounds provided, as in this process, there is sufficient bulk of iron available and sufficient time given between the intervals of tapping to permit such a clean separation. The molten iron is then tapped off at proper intervals while the lighter cement-forming mass is tapped off at a slightly higher level. The iron may be run into pigs as usual in iron manufacture; while the molten cement-forming material is cooled, crushed, and ground to powder in the proper machinery.

I claim:

1. The method of making cement and iron, comprising charging into a furnace calcareous, aluminous and ferruginous materials in such proportions as to constitute a charge containing after loss of its volatile constituents, not less than 25 nor more than 55% of lime, or of lime and magnesia together, not less than 25 nor more than 50% of alumina, nor more than 10% of silica, and not less than 10% of iron oxide, fusing such a charge to the point of complete melting of all its constituent raw materials, in a blast or electric furnace, allowing sufficient time for separation of the reduced metallic iron and the lighter cement-forming compounds, tapping off the iron and the cement-melt separately, and grinding the latter to powder.

2. The process of making cement comprising the complete fusion and subsequent cooling and grinding of a properly proportioned mixture of calcareous, aluminous and ferruginous materials, the proportions of the mixture being such as to produce a final product containing between 25 and 50% lime, between 25 and 50% alumina, between 3 and 10% iron oxide, and not less than 10% nor more than 20% of silica and iron oxide together.

In testimony whereof, I affix my signature.

EDWIN C. ECKEL.